(12) United States Patent
Terpening et al.

(10) Patent No.: US 8,209,739 B2
(45) Date of Patent: Jun. 26, 2012

(54) UNIVERSAL SERIAL BUS—HARDWARE FIREWALL (USB-HF) ADAPTOR

(75) Inventors: John Terpening, Irvine, CA (US); Jason Chen, Irvine, CA (US); Choon Tak Tang, Irvine, CA (US)

(73) Assignee: Kingston Technology Corporation, Fountain Valley, CA (US)

( * ) Notice: Subject to any disclaimer, the term of this patent is extended or adjusted under 35 U.S.C. 154(b) by 445 days.

(21) Appl. No.: 12/534,752

(22) Filed: Aug. 3, 2009

(65) Prior Publication Data

US 2011/0030030 A1    Feb. 3, 2011

(51) Int. Cl.
*G06F 21/00* (2006.01)
*G06F 13/00* (2006.01)
*G06F 17/00* (2006.01)
*G06F 9/00* (2006.01)

(52) U.S. Cl. .............. 726/1; 710/107; 711/104; 726/11

(58) Field of Classification Search ................ 726/1, 11; 710/107; 711/104
See application file for complete search history.

(56) References Cited

U.S. PATENT DOCUMENTS

| | | | |
|---|---|---|---|
| 2007/0266063 A1 | 11/2007 | Camiel | |
| 2007/0287493 A1* | 12/2007 | Stephens | 455/550.1 |
| 2007/0294756 A1* | 12/2007 | Fetik | 726/11 |
| 2008/0010375 A1* | 1/2008 | Coleman et al. | 709/225 |

* cited by examiner

*Primary Examiner* — Kambiz Zand
*Assistant Examiner* — Aubrey Wyszynski
(74) *Attorney, Agent, or Firm* — Sawyer Law Group, P.C.

(57) ABSTRACT

A system and method in accordance with the present invention provides a protected area for software to execute on a separate hardware firewall adaptor when a storage device is operating in an unprotected environment when connected to an uncontrolled or unmonitored host system. This software provides security through a plurality of security, access management and monitoring (SAMM) applications when a USB storage device is connected to a computer in an uncontrolled, unprotected environment.

11 Claims, 5 Drawing Sheets

10

300

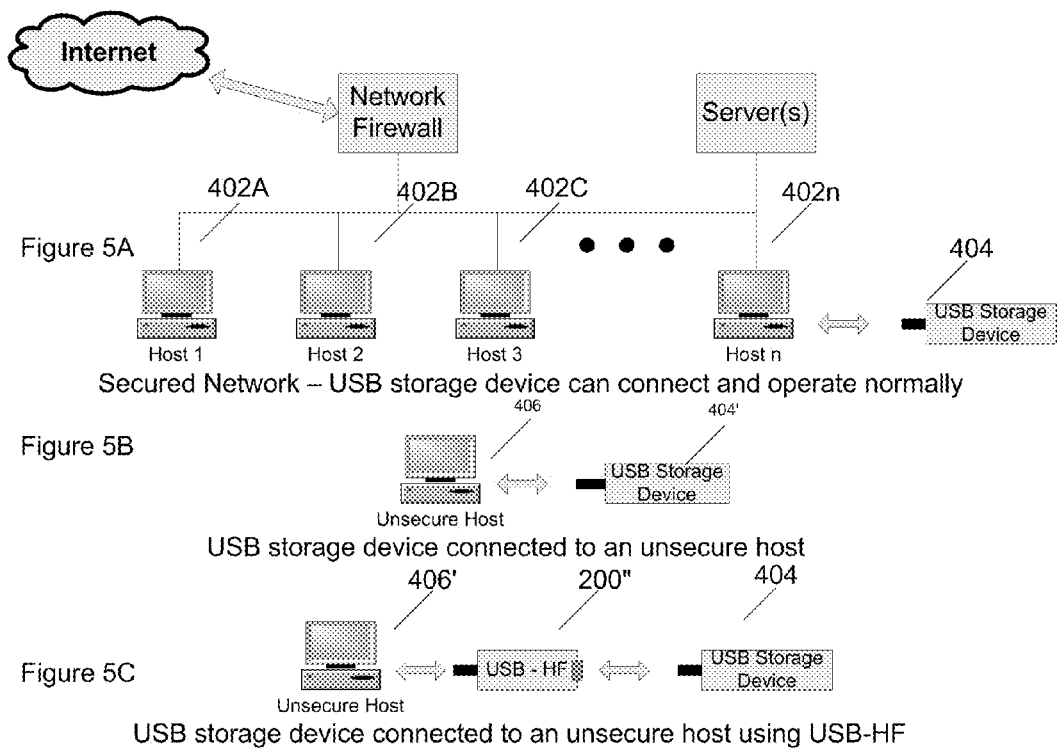

UNIVERSAL SERIAL BUS—HARDWARE FIREWALL (USB-HF) ADAPTOR

FIELD OF THE INVENTION

The present invention relates generally to storage devices, and more particularly to a firewall for such devices.

BACKGROUND OF THE INVENTION

Storage devices are utilized in a variety of environments. Typically they are used to store data for use on a host system. FIG. 1 shows a Flash storage device 10 with an encryption engine 12. This encryption engine 12 can be accomplished in either hardware or software. The device 10 contains host interface logic 14 to interface to a host device. A small, low performance onboard processor 16 is used for overall device control. The device 10 also includes onboard RAM 18 and ROM 20 for device controller firmware operation, Flash memory 22 for data storage, and logic for Flash memory interface 24.

Current technology requires some portion of the security, management and monitoring software to be executed on the host system. This software can be easily compromised when operating in an uncontrolled, non-protected environment.

FIG. 2 shows a Flash storage device 100 that contains some components similar to the device of FIG. 1. However, this device has additional application RAM 102 and a high performance processor 104. This high performance processor 104 and application RAM 102 provide a secure area with enough performance for execution of a plurality of security, access management and monitoring (SAMM) applications within the USB storage device.

The USB storage device 10 depicted in FIG. 1 provides encryption to safeguard the data contained on the device, should the device be lost or stolen. This architecture assumes that the intended user and connected host system is fully trusted. File activities outside the enterprise cannot be controlled or monitored for this device. Such software would have to operate on the host system and is therefore vulnerable to compromise. This also makes the storage device vulnerable to viruses, spyware and malware, since software to guard against such attacks could also be deactivated or compromised when operating on an uncontrolled host system.

The USB storage device 100 in FIG. 2 addresses these issues by providing a secure place for utilizing certain applications, such as the plurality of SAMM applications. However, the added cost of incorporating a high performance processor 104 with additional RAM 102 that has enough processing performance to operate these SAMM applications can be significant. This cost increase would be applied to every USB storage device 100 purchased by an organization that has a need for this level of security and control of data stored on USB storage devices.

A corporation, enterprise or organization which has computers and/or host systems are made secure by granting only limited access to the users. This environment would not require the use of the storage device 100 detailed in FIG. 2 since the plurality of SAMM applications can operate securely from these host systems with significantly reduced risk of being compromised. This extra processing power and dedicated application RAM 102 located on the USB storage 100 device of FIG. 2 is only required when the device is connected to a host system outside the control of the organization. Typically only a small percentage of users will need to use the storage device outside of the enterprise. Hence it would be cost prohibitive to require that all the storage devices have this security capability.

Accordingly, what is needed is a system and method that addresses the above-identified issues. The present invention addresses such a need.

SUMMARY OF THE INVENTION

A system comprises a storage device and a non-secure host. The system includes a hardware firewall adaptor coupled therebetween. The hardware firewall adaptor provides a secure environment for applications to operate when the storage device is utilized outside a controlled environment.

A system and method in accordance with the present invention provides a protected area for software to execute on a separate hardware firewall adaptor when a storage device is operating in an unprotected environment when connected to an uncontrolled or unmonitored host system. This software consists of a plurality of security, access management and monitoring (SAMM) applications when a storage device is connected to a computer in an uncontrolled, unprotected environment.

BRIEF DESCRIPTION OF THE DRAWINGS

FIG. 5A illustrates a first mode of operation of a system in accordance with an embodiment, connecting a USB device to a secure host.

FIG. 5B illustrates a second mode of operation of the system, connecting a USB storage device to a non-secured host.

FIG. 5C illustrates a third mode of operation of the system, connecting the USB storage device to a non-secured host using the USB-HF adaptor.

DETAILED DESCRIPTION

The present invention relates generally to storage devices, and more particularly to a firewall for such devices. The following description is presented to enable one of ordinary skill in the art to make and use the invention, and is provided in the context of a patent application and its requirements. Various modifications to the preferred embodiments and the generic principles and features described herein will be readily apparent to those skilled in the art. For example although a method and system in accordance with the present invention will be discussed in the context of universal serial bus storage devices, such a system and method can be utilized with a variety of storage devices. Therefore, one of ordinary skill in the art readily recognizes that it should not be limited only to USB devices. Thus, the present invention is not intended to be limited to the embodiments shown, but is to be accorded the widest scope consistent with the principles and features described herein.

Figure 2:
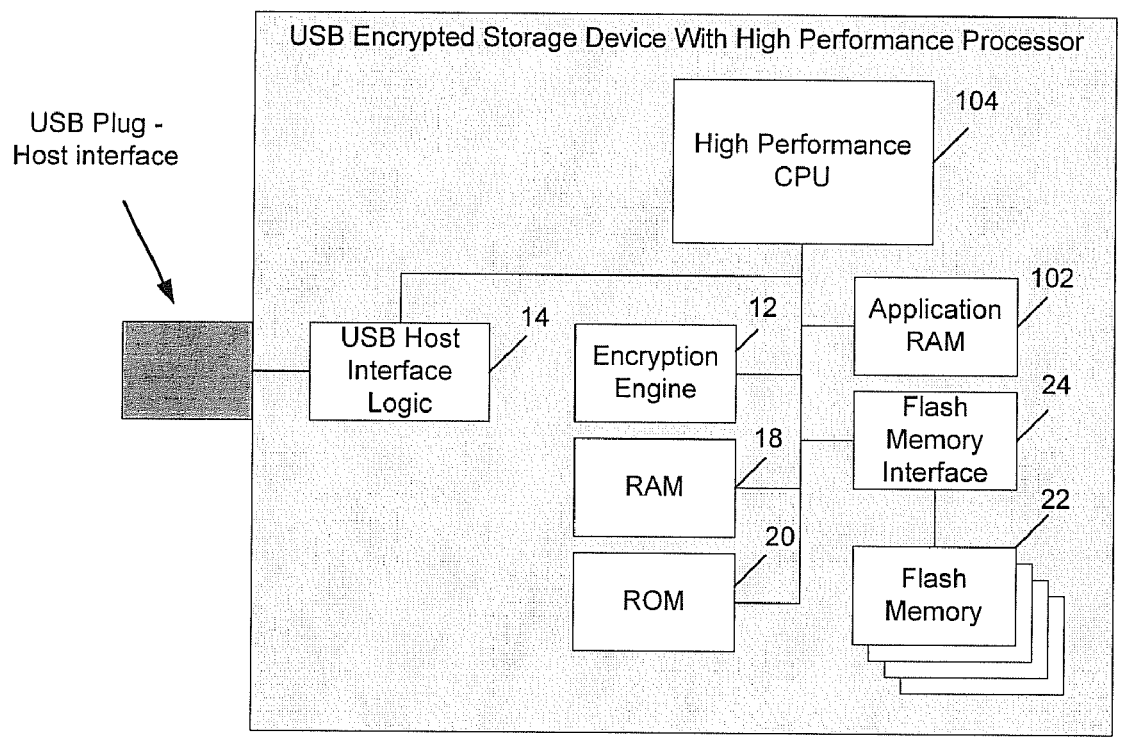
FIG. 2 is a conventional USB storage device with high performance processor and application RAM.

By utilizing a firewall adaptor, high performance hardware is separated from the USB Flash storage device 100 depicted in FIG. 2 and placed on the firewall adaptor. This significantly reduces the cost of the USB storage device while providing a secure environment for security, access management and monitoring (SAMM) applications to operate when outside the controlled environment.

These applications provide security by enforcing access policies that would restrict file operations such as copy, paste, move or rename for files based on their location or type. Restrictions can be placed on these files and/or directories that prevent them from being opened, viewed or modified. Additionally anti-virus/malware software can scan and prevent infected files from being copied to the USB storage device. This software can also prevent files that are encrypted or locked which cannot be scanned from being copied to the drive. Security software can also establish an authenticated, secure communication link between the USB storage device and hardware firewall adaptor safeguarding from "man-in-the-middle" (MITM) type attacks.

Management software can provide remote management functionality to a connected USB storage device. These management features would include storage device lock, unlock, format/erase and password reset.

Monitoring software can monitor all file activities and log these activities into a log file that can be saved locally to either the storage device or the firewall adaptor, or it can be transmitted to a secure server through the internet if access is available. These file activities would include: Delete, Copy, Rename, Paste, Move, Save, Save As and Open.

In utilizing this system, a limited number of firewall adaptors need to be purchased and deployed by an organization. These are provided only when needed to address the specific need for a secure USB interface to non-secure host systems outside the control of the organization. Therefore, Flash storage devices 10 similar in cost to those in FIG. 1 can be purchased and deployed, while a limited number of USB-HF adaptors can be purchased to provide the functionality of the device in FIG. 2 when the USB storage device is required to interface to an unsecured host system.

Figure 3:
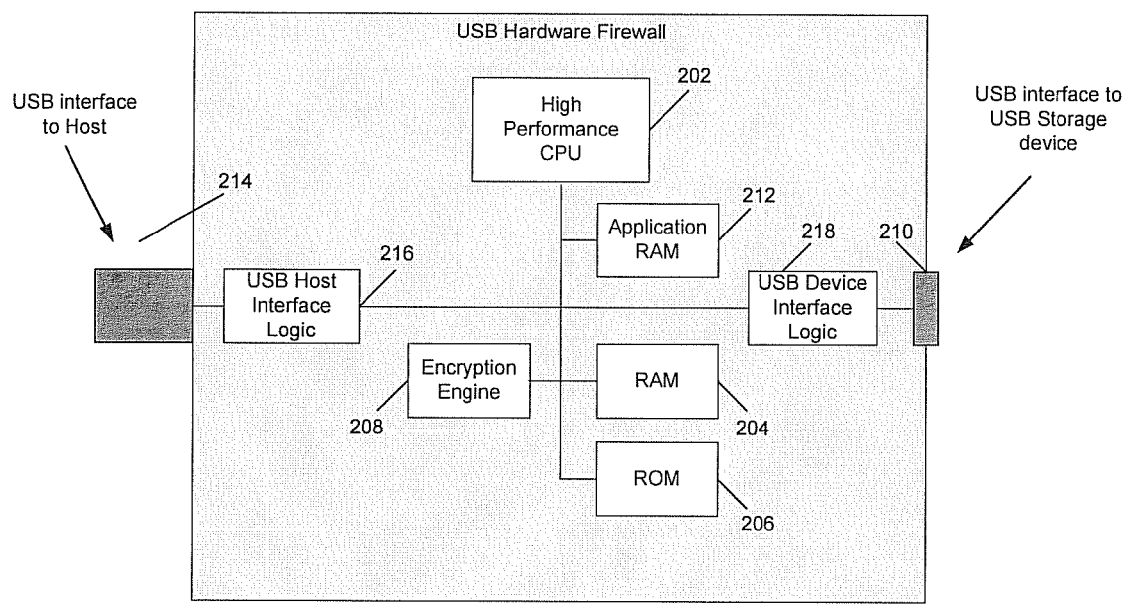
FIG. 3 shows a Universal Serial Bus-Hardware Firewall (USB-HF) adaptor with a high performance processor and application RAM in accordance with the present invention.
Figure 4:
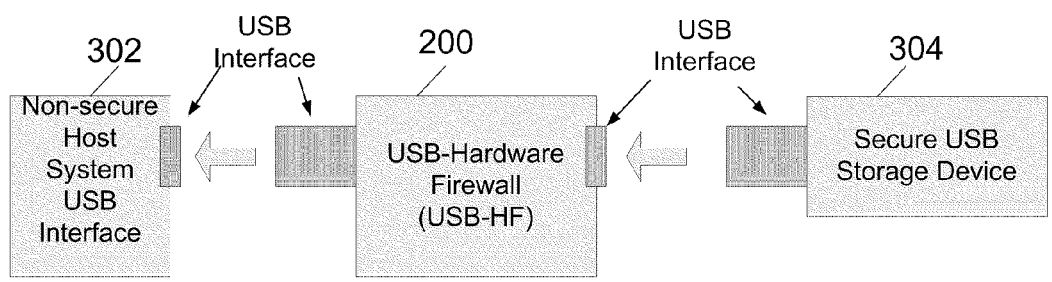
FIG. 4 is a block diagram of a USB Flash storage device being safely interfaced to an unsecured host system using a USB-HF adaptor.

FIG. 3 is a block diagram of an embodiment of a universal serial bus hardware firewall (USB-HF) adaptor 200 in accordance with the present invention. The USB-HF adaptor 200 includes a high performance processor 202 that is coupled to an application RAM 212. The application RAM 212 is provided for execution of the plurality of SAMM applications. The adaptor 200 also includes USB host interface logic 216 coupled to the processor 202 and USB interface to a host 214. The adaptor 200 also includes USB device interface logic 218 which is coupled to the processor 202, and a USB interface 210 for a USB storage device. The adaptor 200 also includes an encryption engine 208 coupled to the high performance processor 202, RAM 204 and ROM 206. The USB interface logic 218 is provided to interface a USB Flash storage device (not shown) to the USB-HF adaptor 200. The USB interface logic 216 is provided for interfacing to an unsecured host system 302 (see FIG. 4). When a compatible USB Flash storage device 304 is connected to the storage interface of the USB-HF adaptor 200, the combined devices 300 can operate securely when connected to an uncontrolled host system 302 as depicted in FIG. 4.

FIGS. 5A-5C show three different scenarios of operation. In FIG. 5A, all hosts 402a through 402n can interface to any storage device 404 within the secured environment. Since these systems are controlled and users have limited access and control of the host system, the plurality of SAMM applications can operate securely in this environment.

Figure 1:
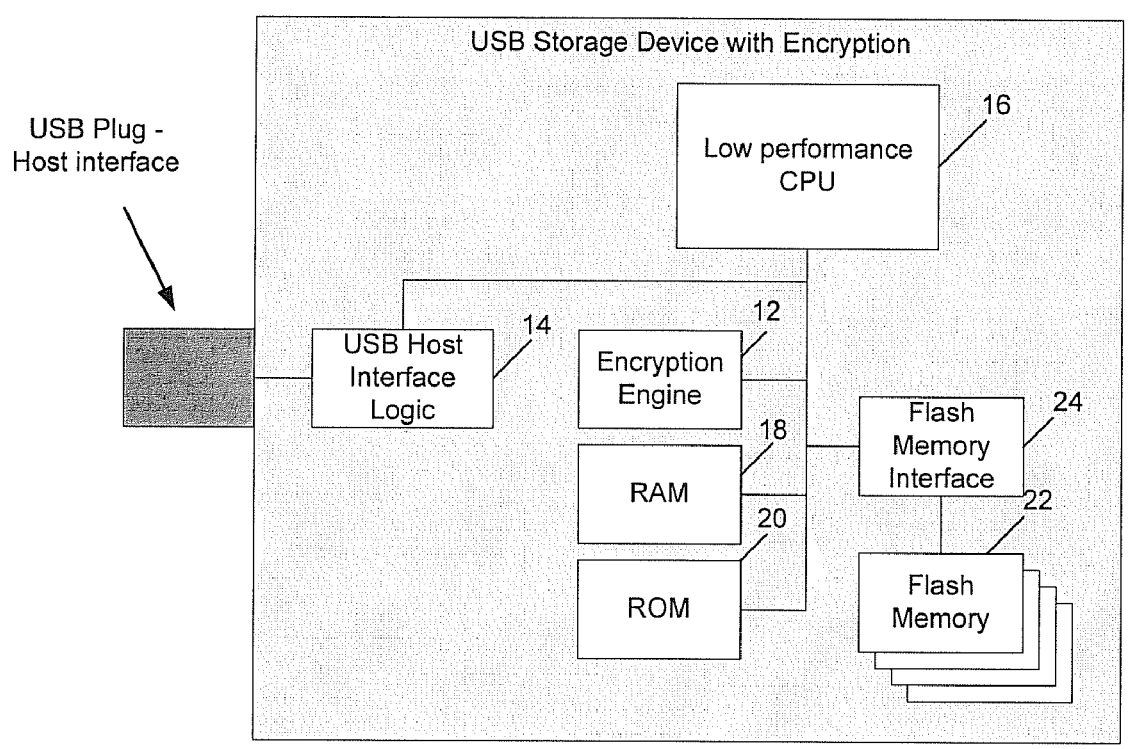
FIG. 1 is a block diagram of a conventional USB storage device with encryption.

In FIG. 5B, a USB storage device 404' is connected to an unsecured host 406. The Flash device 10 as shown in FIG. 1 would operate in this environment. However, the plurality of SAMM applications would not be able to operate securely since they could be easily compromised on this unsecured host. A storage device that is intended to be used with the USB-HF adaptor would not operate in this environment. Therefore unmonitored or restricted activities could not be performed on a USB-HF compatible storage device in this scenario.

In FIG. 5C, a USB-HF compatible storage device 404 is interfaced to the unsecured host 406' using the USB-HF adaptor 200". In this scenario all the SAMM functionality is maintained since the plurality of SAMM applications can operate in a secure area on the USB-HF adaptor.

Current technology requires some portion of the security, management and monitoring software to be executed on the host system. This software can be easily compromised when operating in an uncontrolled non-protected environment.

USB-HF hardware architecture gives software designers a secure protected area with sufficient processing power to execute applications.

Having the processor on the USB-HF adaptor rather than on the USB storage device allows the cost of the storage device to be kept at a minimum. This processing power could be placed on a conventional USB drive, where SAMM software would execute in a controlled protected environment. However high performance processing hardware with sufficient performance required to operate these applications would add significant cost to every USB storage device. Furthermore, this hardware is not required when operating from a computer within a controlled, trusted environment since software can be executed securely on a host system.

Although the present invention has been described in accordance with the embodiments shown, one of ordinary skill in the art will readily recognize that there could be variations to the embodiments, and those variations would be within the spirit and scope of the present invention. For example, although the present invention has been described in the context of USB storage devices it could be utilized with a variety of other environments. Therefore, the use of the present invention could be utilized with SD card, Microcard, Minicard, Compact Flash and the like, and that use would be within the spirit and scope of the present invention. In addition, although present invention has been described in the context of providing a plurality of SAMM applications in a secure area a variety of applications can be provided therein and their use would be within the spirit and scope of the present invention. Accordingly, many modifications may be made by one of ordinary skill in the art without departing from the spirit and scope of the appended claims.

What is claimed is:

1. A system comprising:
a storage device having a processor and a RAM for storage device control;
a non-secure host; and
a detachable hardware firewall adaptor coupled therebetween, the detachable hardware adaptor being independent from the storage device and the non-secure host;
wherein the hardware firewall adaptor provides a secure environment for applications to operate when the storage device is utilized outside a controlled environment.

2. The system of claim 1 wherein the hardware firewall adaptor comprises:
an application RAM for storing the applications, and
a high performance processor for executing the applications.

3. The system of claim 1 that comprises of a plurality of applications that are executed by the hardware firewall adaptor.

4. The system of claim 3 wherein the plurality of applications enforce policies that would restrict file operations, provide remote management functionality and monitor file activities and log these activities to be saved to either the storage device, the hardware firewall adaptor or a secure remote server.

5. A Universal Serial Bus-Hardware Firewall (USB-HF) adaptor comprising:
- a first interface adapted to be detachably coupled to a separate non-secure host device;
- a USB host interface logic coupled to the first interface;
- a second interface adapted to be detachably coupled to a separate, independent USB storage device having a processor and RAM for device control;
- a USB device interface logic coupled to the second interface;
- an application RAM for storing applications; and
- a high performance processor coupled to the application RAM, USB host interface logic and USB device interface logic, wherein the processor executes the applications.

6. The system of claim 5 that comprises of a plurality of applications that are executed by the USB-HF.

7. The USB-HF adaptor of claim 6 wherein the plurality of applications enforce policies that would restrict file operations, provide remote management functionality and monitor file activities and log these activities to be saved to either the storage device, the USB-HF adaptor or a secure.

8. A system comprising:
- a USB storage device having a small processor and small RAM;
- a non-secure host; and
- a separate, detachable Universal Serial Bus-Hardware Firewall (USB-HF) adaptor coupled therebetween; wherein the USB-HF adaptor provides a secure environment for applications to operate when the USB storage device is utilized outside a controlled environment.

9. The system of claim 8 wherein the USB-HF adaptor comprises:
- an application RAM for storing the applications, and
- a high performance processor for executing the applications.

10. The system of claim 8 that comprises of a plurality of applications that are executed by the USB-HF adaptor.

11. The system of claim 10 wherein the plurality of applications enforce policies that would restrict file operators, provide remote management functionality and monitor file activities and log these activities to be saved to either the storage device, the USB-HF adaptor or a secure server.

* * * * *